Oct. 18, 1966 R. K. GLOVER, JR., ETAL 3,279,722
AIRCRAFT MOVING DEVICE

Filed Aug. 7, 1964 6 Sheets-Sheet 1

INVENTORS
RUSSELL K. GLOVER, Jr.
JACK D. JONES
BY

*Jerome R. Cox*

ATTORNEY

FIG. 3

INVENTORS
RUSSELL K. GLOVER, Jr.
JACK D. JONES
BY
Jerome R. Cox
ATTORNEY

Oct. 18, 1966 R. K. GLOVER, JR., ETAL 3,279,722
AIRCRAFT MOVING DEVICE
Filed Aug. 7, 1964 6 Sheets-Sheet 3

INVENTORS
RUSSELL K. GLOVER, Jr.
JACK D. JONES
BY
Jerome R. Cox
ATTORNEY

INVENTORS
RUSSELL K. GLOVER, Jr.
JACK D. JONES
BY
Jerome R. Cox
ATTORNEY

Oct. 18, 1966  R. K. GLOVER, JR., ETAL  3,279,722
AIRCRAFT MOVING DEVICE
Filed Aug. 7, 1964  6 Sheets-Sheet 5

INVENTORS
RUSSELL K. GLOVER, Jr.
JACK D. JONES
BY
Jerome R. Cox
ATTORNEY

Oct. 18, 1966　　　R. K. GLOVER, JR., ETAL　　　3,279,722
AIRCRAFT MOVING DEVICE
Filed Aug. 7, 1964　　　　　　　　　　　　　　　6 Sheets-Sheet 6

FIG. 11

INVENTORS
RUSSELL K. GLOVER, Jr.
JACK D. JONES
BY

*Jerome R. Cox*
ATTORNEY

United States Patent Office 3,279,722
Patented Oct. 18, 1966

3,279,722
AIRCRAFT MOVING DEVICE
Russell K. Glover, Jr., and Jack D. Jones, Lima, Ohio, assignors to The National Can Retinning Co., Lima, Ohio, a corporation of Maryland
Filed Aug. 7, 1964, Ser. No. 388,241
9 Claims. (Cl. 244—50)

The inventions disclosed and claimed in this application relate to aircraft handling devices and specifically to devices for maneuvering aircraft while on the ground. The inventive embodiments disclosed are specifically devices designed especially for maneuvering helicopters, although it is clear that our inventions are applicable to the handling of other types of aircraft and also other wheeled vehicles.

There are special problems involved in handling helicopters while on the ground. Helicopters may land on a regular landing field, but because of their special characteristics are often used to transport people or supplies to places where there is no regular landing field and are thus required to land in such places. Because of their special nature, they do not even require landing wheels and are often equipped merely with landing skids. Landing wheels and typical landing gears are often eliminated from helicopters because the drag thereof adds to power requirements and lowers the efficiency. Even when equipped with landing wheels, it is not easy for one person or even for several to move the helicopter on the ground. This is especially true if the helicopter is relatively large or if the place where the helicopter lands is not level. The rotor and the propeller of such helicopter devices are not usually adapted to move such a device while on the ground whether the place involved is a smooth landing field, a relatively level plot far from civilization or an uneven terrain near a battlefield.

The military forces use helicopters extensively in the transportation of personnel and of supplies to all sorts of places. Often when a military crew lands, it is highly desirable that the helicopter be moved at once to a place of concealment. Obviously there are sometimes no tow trucks available such as can usually be found at landing fields. Moreover, it is impractical for a helicopter in such cases to transport a heavy tow truck with it.

Prior hereto many efforts have been made to solve the ground handling problems of aircraft. Most of these efforts have been directed toward the handling of large conventional type aircraft. Many such attempts have used more or less conventional tow trucks wherein either the aircraft wheels are raised above the supporting wheels of the tow truck or the tow truck wheels are supported above the ground but under the aircraft while the motive power of the truck is exerted either to push or pull the aircraft.

Some of the attempts heretofore proposed were directed to devices which utilize a friction drive wheel which contacts the single nose ground engaging wheel of the aircraft, thus rotating it on the ground for moving the aircraft. With such devices steering of the aircraft is difficult.

One of the objects of our invention is the solution of ground handling problems inherent in aircraft and other rubber-tired equipment especially handling problems inherent in aircraft of the helicopter type.

A further object of our invention is the provision of an improved mechanism for driving tires of an aircraft by friction driving which is substantially maintenance free, economical, dependable, powerful, and a lightweight combination of basic components.

A further object of our invention is the provision of an electrical driving device which is in effect an electrical differential operative to drive cooperatively a pair of twin ground wheels.

A further object of the invention is the provision of a design for maneuvering aircraft of the helicopter type upon the ground which will provide virtually maintenance free operation.

Further objects and features of the invention will be apparent from reading of the following specification and claims and from a consideration of the accompanying drawings.

*Detailed description*

Figure 1:
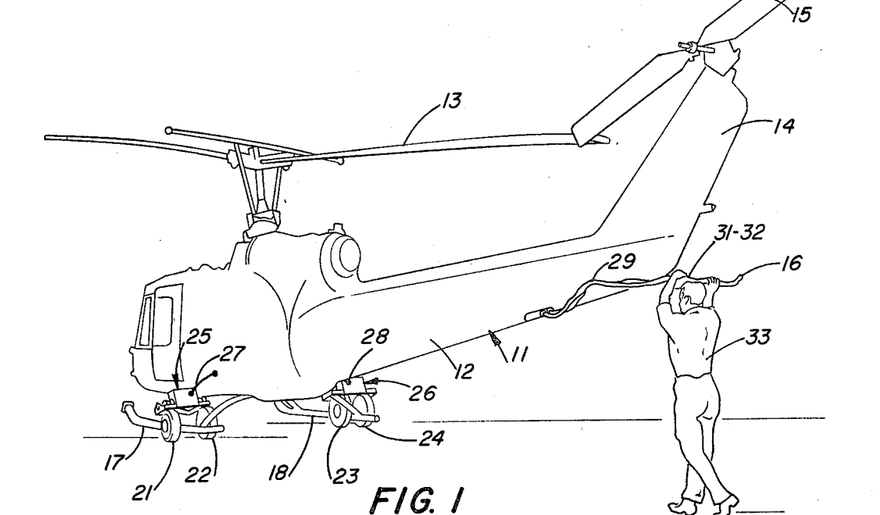
FIG. 1 is a view in perspective of a helicopter aircraft equipped with devices constituting embodiments of our invention.

Referring especially to FIG. 1, it may be seen that we have shown a helicopter aicraft 11 equipped with a body 12, a rotor 13, a tail 14, a tail rotor 15, a tail skid 16, and landing skids 17 and 18. Associated with the landing skid 17 and mounted on an axle secured to said landing skid 17 are a pair of landing wheels 21 and 22. Similarly mounted on an axle secured to said landing skid 18 are a pair of landing wheels 23 and 24. We secure one of our novel driving units 25 adjacent to the pair of wheels 21 and 22 and another similar unit 26 adjacent to the pair of wheels 23 and 24. These driving units are controlled by electrical connections including the cords 27 and 28 which are continued to the rear of the helicopter as at 29 and are controlled by switches 31 and 32 incorporated in or attached to the tail skid 16. These switches may be controlled by a man as at 33 either together or individually so that the helicopter may be steered by operation of one of the units, as for example, 25, while holding the other unit 26 inoperative, or by operating one of the units rearwardly while holding the other stationary, or by operating one unit at a greater speed than the other, either forward or backward. The wheels 21, 22, 23 and 24 are so attached to the helicopter that the helicopter is substantially balanced upon the wheels and the units 25 and 26 are so efficient that they are able to move the wheels forward or rearwardly as desired.

Figure 2:
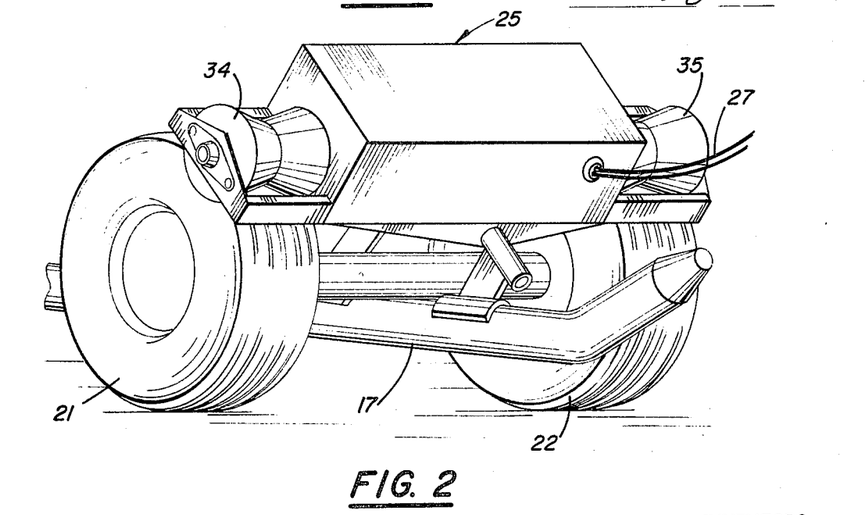
FIG. 2 is a perspective view on a greatly enlarged scale of one of our driving units shown attached to one pair of the landing wheels and the associated landing gear of the helicopter of FIG. 1.
Figure 3:
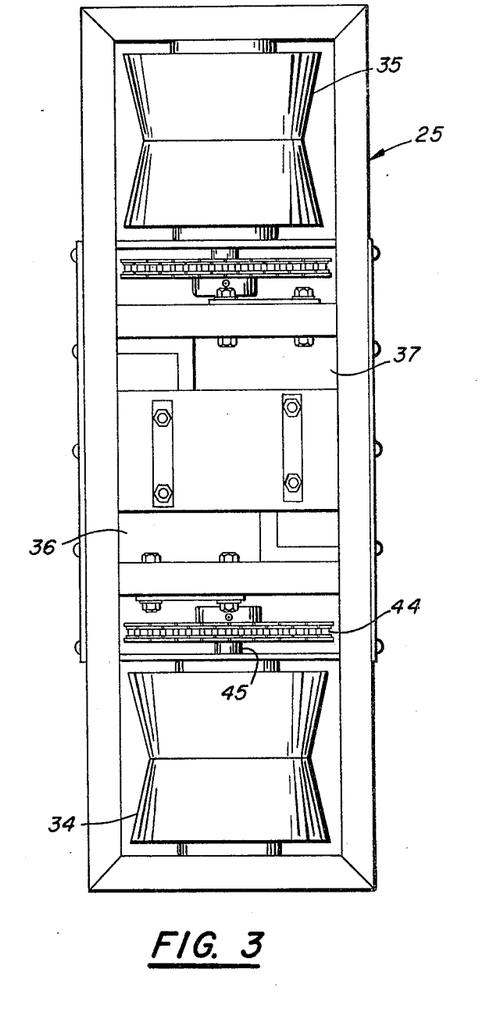
FIG. 3 is a bottom plan view of the driving unit of FIGS. 1 and 2.
Figures 4, 5, 6:
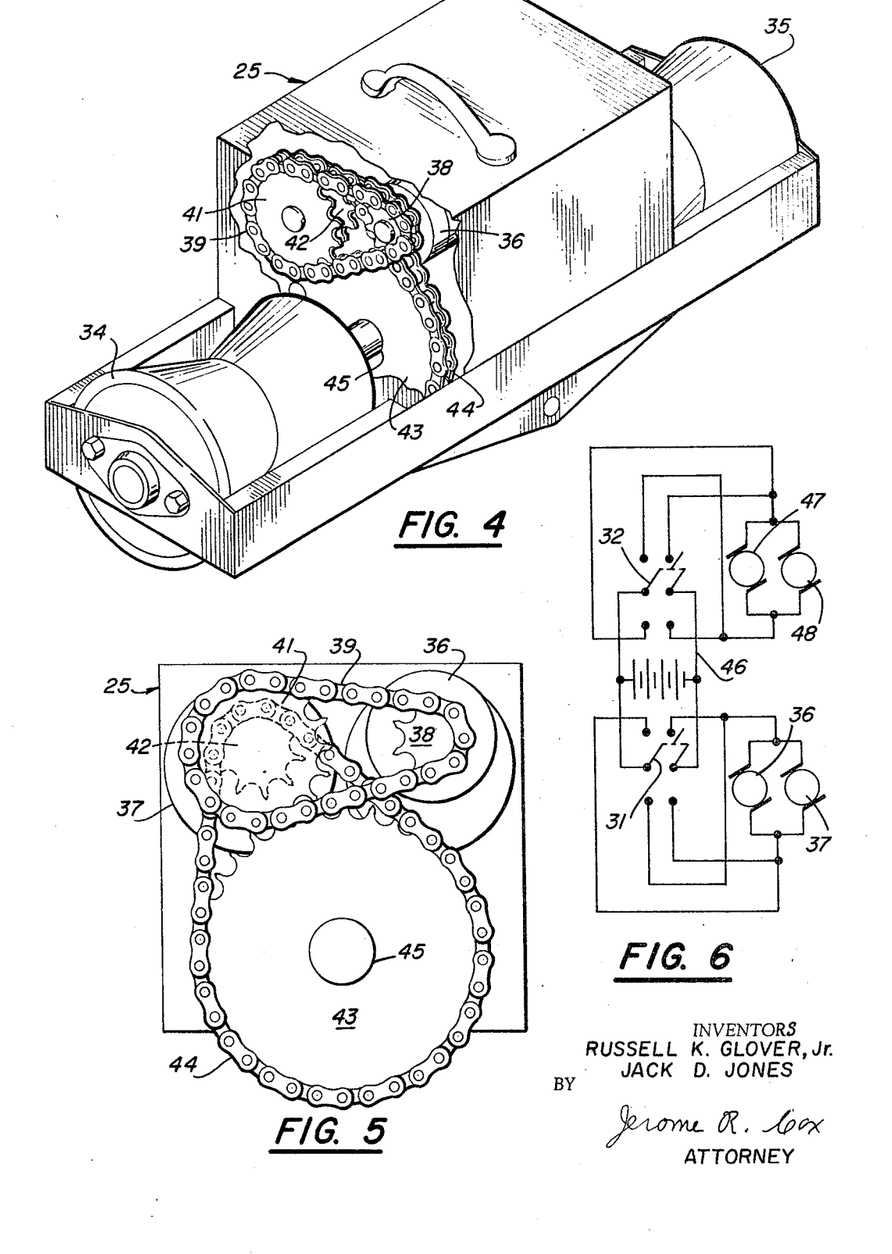
FIG. 4 is a fragmentary view in perspective of the unit shown in the preceding figures having parts broken away and showing especially the chain drive for one of the friction drive elements of the unit.
FIG. 5 is a view in elevation of the chain reduction gearing of the chain drive of FIG. 4 by which the friction element of the unit (i.e. the element which drives the landing wheels) is driven, the cover of the unit having been removed in order to show the chain reduction gearing.
FIG. 6 is a diagrammatic view illustrating the electrical circuit by which the motors shown in FIGS. 4 and 5 are controlled.
Figure 7:
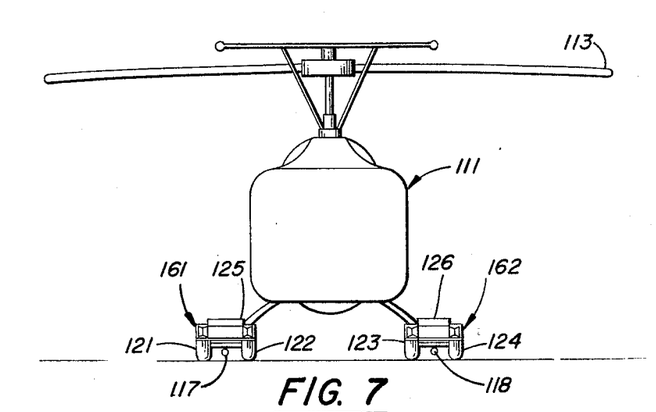
FIG. 7 is a view in front elevation of another helicopter equipped with an embodiment of our invention.
Figure 8:
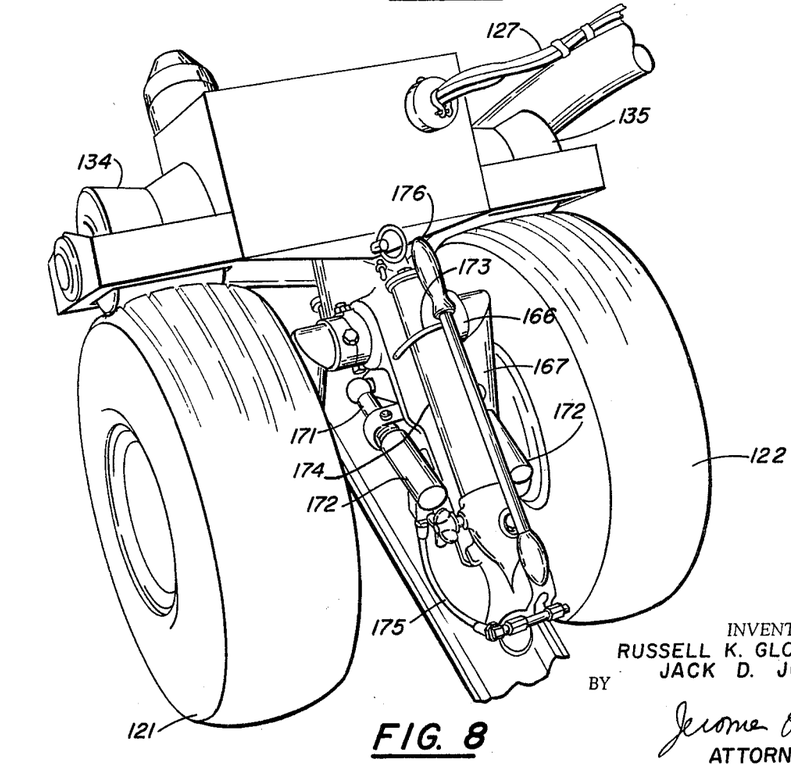
FIG. 8 is a view in perspective and on an enlarged scale showing one of our units attached to the landing skid of the helicopter of FIG. 7, the unit being combined with a special wheeled truck whereby the helicopter may be raised by means of the skid and then maneuvered by my device substantially at the will of a single operator.

Referring now to FIGS. 2, 3, 4 and 5 for a more detailed description of one of the units, as for example unit 25 (which may be taken for illustration inasmuch as the units 25 and 26 are identical), it may be seen that the unit 25, as shown in FIGS. 2, 3 and 4 comprises a pair of friction wheels 34 and 35, each engaging one of the wheels 21 and 22. The friction wheel 34 is driven by a motor 36 and the friction wheel 35 is driven by a motor 37. The drive from each of these motors to the associated friction wheel is substantially identical and is illustrated best in FIGURES 4 and 5, wherein it may be seen that the motor 36 drives a small sprocket 38. The sprocket 38 is connected by a chain 39 with a larger sprocket 41, carrying on the same shaft a smaller sprocket 42 which drives a much larger sprocket 43 through a chain 44. The sprocket 43 is mounted on the shaft 45 which also carries the friction roller 34. The drive of the friction roller 35 from the motor 37 is substantially identical. The motors 36 and 37 are of the commutator type and are controlled (see FIG. 6) by a double-pull double-throw switch 31 whereby the motors may be driven either forward or backward. Electricity for energizing the motors is provided by a battery 46 which also provides electrical energy for motors 47 and 48, which drive (in an identical manner with that just described) a pair of friction rollers (not shown) associated respectively with the wheels 23 and 24.

This device has been developed incorporating the basic theory that driving a vehicle tire by a friction drum or wheel such as our wheels 34 and 35, would ultimately be the most practical and universally adaptable method of solving the ground handling problems inherent to aircraft and other rubber-tired equipment. This theory has the coincidental advantage of a substantial "bonus" in leverage because of driving the tire at its perimeter rather than at the wheel hub or axle. Our general conclusion from our investigation is that the most maintenance free, economical, dependable, powerful and lightweight combination of basic components for this type of drive is:

(a) A V shaped, ball-bearing mounted aluminum drum such as the friction wheels 34 and 35.

(b) A chain and sprocket coupling such as the couplings 38–45 inclusive.

(c) A precision built, light-weight, series wound, high speed D.C. motor such as the motors 36, 37, 47 and 48 and a gear box combination.

The torque output of the drive motors may be expected to vary directly as the square of the applied voltage varies. For this reason it is important that a current carrying relay system be provided as explained in connection with FIG. 11 and it is desirable that the relay be as close coupled to the drive units as practical. Number eight (8) wire is recommended for this circuit. We would further recommend that either a mechanical or electrical momentary delay be built into the reversing controls. Although this delay (perhaps one second) is not absolutely necessary, it will lead to considerably longer brush life by eliminating the high arcing characteristic with instantaneous reversing, and it will reduce the danger of an operator being thrown off balance by rapid directional change. In our latest control we provide a positive lock out switch such that the on-off trigger must be released before the reversing switch can be changed.

Having observed the drive units in operation under various conditions from a hard, level ramp to soft sand and mud, we conclude that with proper wiring:

(a) On a hard, level surface the four drive motors 36, 37, 47 and 48 are "loafing along" at a combined current drain of 45 to 55 amps.

(b) On rough, grassy ground the motors probably draw momentary peaks of 120 to 140 amps.

(c) In soft sand and mud the motors may draw from 150 to 200 amps.

(d) It will probably be very difficult to stall all four drive motors at one time because of their characteristic of maximum torque at stall. It is more likely that the tires will skid or that the friction drums will slip on the tires. In fact, the two drive units (depending, of course, on applied voltage) can be expected, at stall, to draw 300 to 325 amps. and produce approximately 1200 foot pounds of torque.

Our twin-drive units eliminate the usual problems encountered with mechanical differentials because each drum is driven independently by each motor. The motors, wired in parallel are inherently self-regulating and provide, in effect, and "electrical differential."

Our drive motors have been engineered and manufactured to conform to the highest possible standards. Developed especially for 24 volt operation, their fields and armatures are in perfect electrical balance. Field coils utilize wire (having one coat of Formvar and one of nylon) and are taped and assembled before dipping in varnish and baking. This provides extra insulation and strength, and also protection against any ambient moisture.

Armatures utilize the same wire for windings and are dipped and baked twice, providing a homogeneous mass required at high speeds. Every field and armature is subjected to a breakdown voltage check of 1250 volts and is ground checked at 600 volts. Armature and field laminations are stamped from the best electrical sheet steel available. Every armature is dynamically balanced to practically eliminate vibration even though operating at speeds up to 25,000 revolutions per minute (or about 2.5 peripheral miles a minute) leading to longer life for brushes, bearings and quieter operation. The armatures are supported by ball-bearings at both the fan and commutator ends so that maximum rigidity is obtained. The armature shafts are heavy enough so that no deflection occurs while running.

Commutators have staked and soldered wire connections for additional protection against open circuits developing. They are precisely turned to size for proper brush contact, and all mica segments are undercut $\frac{1}{32}''$ deep for longer brush life and better commutation. The mating surfaces of all parts are turned or bored to assure the ultimate in fit. All gears, shafts and spindles are carefully heat-treated and are produced from a material such as 4340 steel or equivalent. All gear teeth are helical cut. In the gear case, ball-bearings are used on the fronts of all shafts to handle thrust requirements. The rear ends of the spindle and intermediate shafts are supported by needle bearings which allow the use of larger diameter shaft ends.

It is believed that the design described herein will provide virtually maintenance-free operation with the exception of the occasional cleaning of the removable air filter.

The use of the novel units 25 and 26 as described above in connection with FIGS. 1–6 is intended to apply to aircraft whether conventional or of the helicopter type where the aircraft is equipped with two pairs of substantially permanently attached laterally spaced landing wheels (i.e. aircraft which has one pair of wheels on one side of the longitudinal center line and one pair of the opposite side of such center line), said wheels approximately serving both for landing purposes and for moving such aircraft upon the ground. The units 25 and 26 are obviously useful in all such cases and the novelty of the drive units 25 and 26 by themselves or in combination with such substantially permanently attached landing and moving wheels is intended to be claimed herein. However, these units are also useful in combination with wheel units which are capable of being removed from the aircraft and attached when needed. For example as suggested above, landing wheels and landing gears add appreciably to the drag of aircraft. Especially in the case of helicopters it is often advantageous to use skids for landing and carry wheel unit which may be attached to the skids after the helicopter has landed and then used for moving the helicopter from one place to another. Therefore in FIGS. 7 to 10 inclusive, we have shown the combination of our driving units (i.e., units like 25 and 26) combined with detachable wheel units which may be attached to a helicopter after landing on which the helicopter may thereafter be supported and moved. In the embodiment shown in FIGS. 7–10 inclusive many parts identical with similar to corresponding parts in the embodiment shown in FIGS. 1–6 are indicated by the same numbers with the addition of 100.

Figure 9:
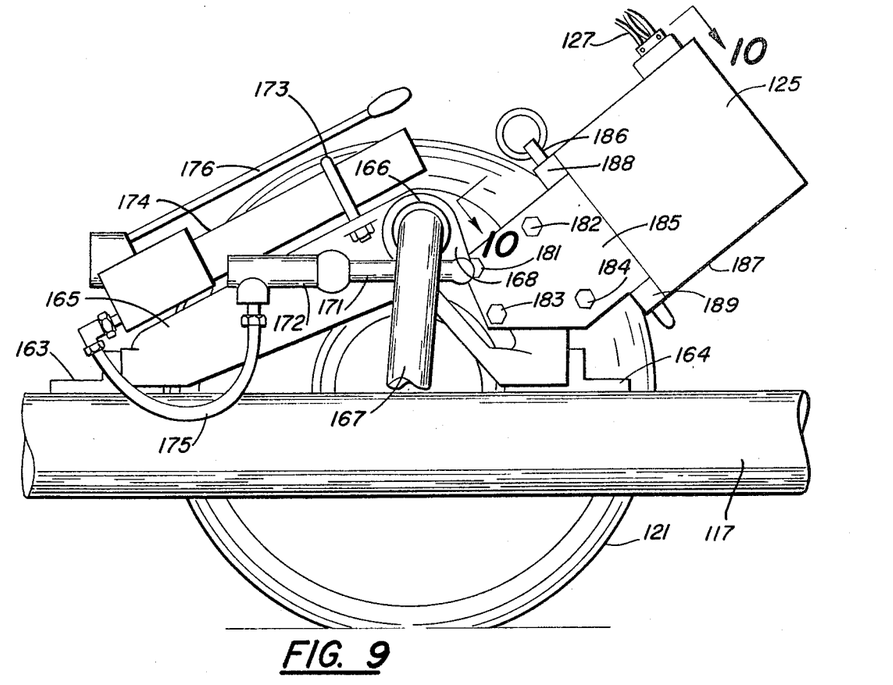
FIG. 9 is a fragmentary view in side elevation of a portion of the devices shown in FIGS. 7 and 8.

In the embodiment shown in FIGS. 7 to 10 inclusive, we have shown a helicopter 111, having a rotor 113 and landing skids 117 and 118. Attached to the skid 117 is a wheel unit generally designated as 161. A similar wheel unit generally designated as 162 is attached to the skid 118. These wheel units are the same and the description of one will suffice for both. The skid 117 (see FIG. 9) is provided with a pair of brackets 163 and 164. Secured to the brackets 163 and 164, for example by bolts, is a substantial supporting frame structure 165. Thus the supporting frame 165 is attached to the skid 117 by means of the brackets 163 and 164, as shown in FIG. 9. This supporting frame 165 has journalled therein a sleeve 166, in which is a yoke 167. The yoke 167 carries stub axles (not shown) which carry the wheels 121 and 122. The yoke 167 has formed therewith a lever 168 for rotating the yoke 167 in the sleeve 166. The arm or lever 168 is connected to one end of a hydraulic piston 171, the piston extending into a hydraulic cylinder 172. Also mounted on the frame 165 as by U-bolts such as 173 is a hydraulic pump 174. The pump is connected as by a hose 175 with the hydraulic cylinder 172. Operation of the pump 174 by its handle 176 pumps hydraulic fluid through the hose 175 to the cylinder 172, thus extending the piston 171 and rotating the arm 168. By operating the pump 174, it is thus possible to rotate the yoke 167 in its bearing 166. Thus the stub axles of the wheels 121, 122, 123 and 124 may be moved downward relative to the landing skid 117 and the helicopter raised upon the wheels 121 and 122 and the corresponding wheels 123 and 124. The wheel units are so positioned relative to the center of gravity of the helicopter that the helicopter is substantially balanced on said wheels.

Secured by bolts 181, 182, 183 and 184 on the frame 165 is a bracket 185 formed with a bore for a pin 186. A casing 187 for motors and reduction gears unit 125 has ears 188 and 189 and the pin 186 extends through the bore in the bracket 185 and holds the casing 187 securely upon the frame 165. Within the casing 187 are electric motors corresponding to motors 36 and 37. These motors drive the friction rollers 134 and 135 in a manner identical with that by which the rollers 34 and 35 are driven. These rollers in turn contact and drive the ground wheels 121 and 122 respectively either forward or backward as desired by the operator. Electrical current is supplied to the casing 187 by wires 127, and by wires connected to switches associated with the tail skid as explained in connection with the embodiment of FIGS. 1–6 inclusive. A similar arrangement is provided for driving wheels 123 and 124.

The units 125 and 126 are identical with the units 25 and 26. Each contains a pair of electric motors with each of which is combined a chain gear speed reduction device which drives its associated friction rollers and through it its associated ground wheel. Electrical connections such as 127 and 128 lead from the motors to the fuselage of the aircraft and to the aircraft battery or by high current relays such as explained below in connection with FIG. 11, and the switches, provided at the tail skid.

Figure 10:
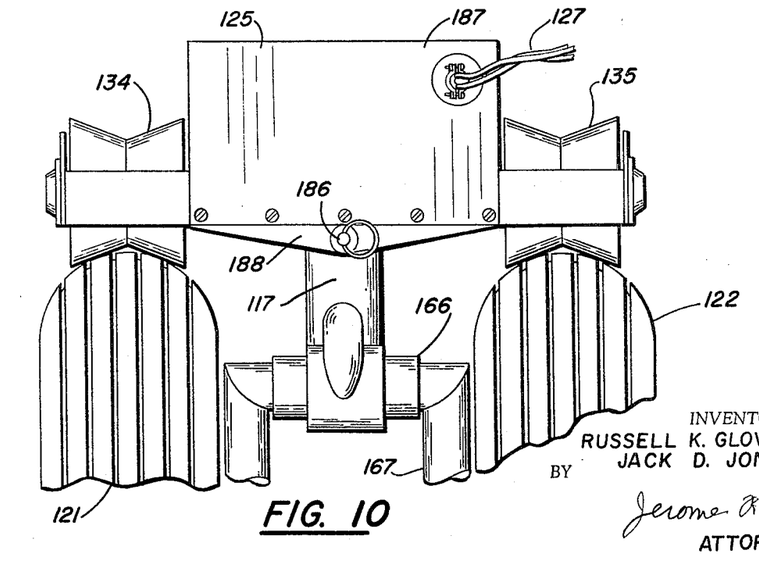
FIG. 10 is a fragmentary view in rear elevation of the devices shown in FIGS. 7, 8 and 9.
Figure 11:
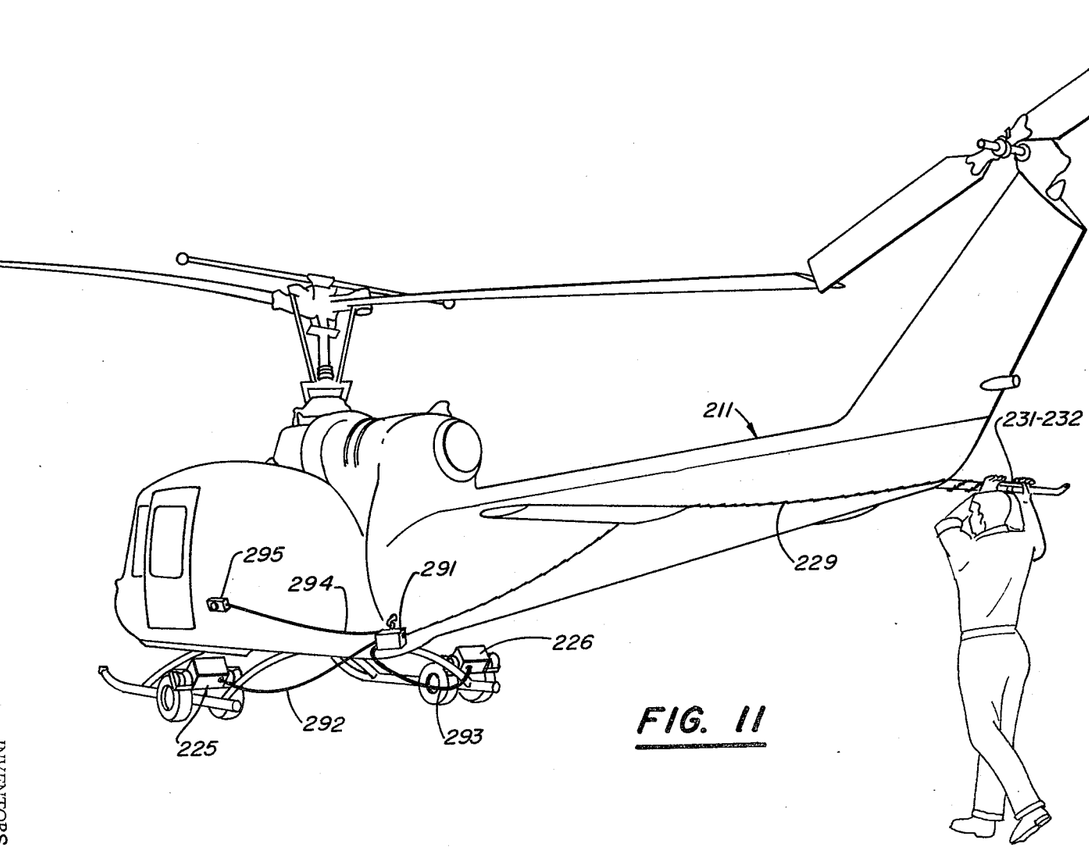
FIG. 11 is a fragmentary view in perspective of a helicopter aircraft equipped with similar devices and constituting another improved alternative embodiment of our inventions.

In FIG. 11 is shown an improved and preferred embodiment of our invention. Therein the parts are designated by the same numerals as used in connection with FIGS. 1–6 with the addition of 200 and as used in connection with FIGS. 7–10 with the addition of 100. That is, the helicopter 211 of FIG. 11 corresponds to the helicopter 11 of FIG. 1, and 111 of FIG. 7, etc. The switches 231 and 232 are connected by wires 229 with a heavy duty current carrying unit such as 291 comprising a pair of relays or contacters and by the control wires such as wires 292 and 293 with driving units 225 and 226 respectively. The relay 291 is connected by wire 294 with battery contacter 295.

Operation

In the normal flying operation of a helicopter, such as that shown in FIG. 1, the units 25 and 26 would not be attached to the landing gears. The aircraft would land upon the landing wheels 21, 22, 23 and 24. Thereupon the units 25 and 26, units 125 and 126, or units 225 and 226 would be attached to skids 17, 18, 117, and 118 respectively. The method of attaching is shown best in FIGS. 9 and 10 showing how the unit 125 is secured to the skid 117. The ears 188 and 189 of unit 125 are fastened by pin 188 to bracket 185 which is secured to the supporting frame 165. The frame 165 is secured by brackets 163 and 164 to skid 117. The units may, if desired, be attached to any other convenient part of the landing gear of the aircraft in any convenient manner. The operator by manipulation of the switches 31 and 32 provided in the tail skid 16, operates the motors 36 and 37 of the unit 25 and the corresponding motors 47 and 48 in the unit 26 to drive the friction rollers 34 and 35 through the chain gears 38, 39, 41, 42, 43 and 44 and the shaft 45, and the rollers 51 and 52 through the corresponding gears on the opposite side of the unit. The ground wheels 21, 22, 23 and 24 are thus driven. By a manipulation of the switches the operator can cause the wheels 21 and 22 to rotate forward while holding the wheels 23 and 24 substantially stationary, or he can cause the wheels 23 and 24 to move forward while holding the wheels 21 and 22 substantially stationary. He can, if he desires, rotate the wheels 21 and 22 to move rearward while holding 23 and 24 stationary or can rotate the wheels 23 and 24 rearward while holding 21 and 22 stationary. He can cause both sets of wheels to rotate forward or can cause both sets to rotate rearward. The electrical differential created by connecting the motors in parallel allows one of the wheels of each set to be driven slightly faster than the other so that the device may turn easily. Thus the aircraft can be moved forward or backward or turned as desired.

The operation of the structure illustrated in FIGS. 6–10 and described in connection therewith is quite similar. However, while flying the helicopter 111 both the wheel units 161 and 162 and the drive units 125 and 126 would often be removed and stored in the fuselage of the helicopter. The aircraft would then be landed on the landing skids 117 and 118. Thereupon the units 161 and 162 would be attached through bolts through brackets 163 and 164 and corresponding brackets on skid 118. The unit 125 would be attached by the pin 186 and the unit 126 attached in a similar manner. Then the handle 176 would be operated to rotate the U-support 167. This moves the wheels 121 and 122 downward and raises the aircraft on said wheels. By similar means the wheels 123 and 124 are turned down and under so that the helicopter is substantially balanced on wheels 121, 122, 123 and 124. The operator then operates the switches at the tail skid to move the aircraft forward, backward, or around as explained in connection with the aircraft 11 above, the units 125 and 126 driving the wheels 121, 122, 123 and 124 as previously explained.

The operation of the structure illustrated in FIG. 11 is substantially identical except that the switches 231 and 232 control a relay unit 291 which in turn controls the units 225 and 226. This prevents arcing at the switches 231 and 232 and prevents burning out of these switches. It also allows the use of much smaller and lighter wires between the switches 231 and 232 and the relay 291.

It is to be understood that while the embodiments illustrated constitute preferred embodiments of the invention, it is not to be construed as limited thereby and that the embodiments are for the purpose of illustration only and that the spirit and scope of the invention are to be measured by the appended claims.

We claim:

1. In a device of the character described, in combination, an aircraft having a pair of landing devices spaced laterally of the aircraft, each such landing device including a wheel structure on which said aircraft is arranged to roll which said aircraft is also arranged to slide;

an electric power device for each of said wheel structures, each secured upon one of said tail skids and each including an electric motor and a friction wheel driven by said electric motor;

means for rotating said wheel structures relative to said landing skids to move the wheel structure into and out of ground contact and correspondingly to move the landing skids out of and into ground contact and coincidentally to move the wheel structures into contact with said friction wheels;

a pair of switches adjacent the tail skid on said aircraft; and connections between said switches and said power devices whereby an operator positioned adjacent to the tail skid of said aircraft may operate one or both of said power devices to maneuver said aircraft upon the ground.

2. A motor unit for maneuvering an aircraft upon the ground, the aircraft having a pair of ground wheels having an electric battery and having a hydraulic motor system, said motor unit comprising:

a rectangular frame;

a pair of electric motors mounted on said frame adjacent to the ends thereof;

a pair of friction wheels each driven by one of said electric motors individually and each mounted on said frame between its driving electric motor and the end of the frame and each of said pair of said friction wheels at times contacting one of said pair of ground wheels;

a source of electromotive power comprising a battery; and means for connecting said motors to said electromotive power; and said hydraulic motor system comprising means to move each of the wheels of one of said pairs of wheels into contact respectively with each of the wheels of said other pair of wheels in such relationship so that the friction wheels contact the ground wheels at a point on the top half of the circumference of the ground wheel, whereby the said electric motors, when energized, drive said pair of friction wheels and said friction wheels, when in contact with said ground wheels, drive said ground wheels to move said aircraft.

3. A combination of devices for maneuvering on the ground entirely by means of a friction drive, a helicopter aircraft having a pair of landing skids, said combination comprising a pair of supporting wheels adapted to be secured to each said landing skid;

a plurality of friction wheels each of which is adapted to be contacted by one of said supporting wheels at a point which is on the upper half of the circumference of said supporting wheel;

a hydraulic means associated with said pair of supporting wheels for bringing said supporting wheels into ground contact by rotating said wheels relative to said landing skids about an axis offset from the rotative axis of said wheels and for at the same time bringing each into contact with its associated friction wheels; and means for rotating said friction wheels and for imparting by reason of the rotating of said friction wheels, a turning force on the upper portion of the circumference of said supporting wheels and thereby driving and maneuvering said aircraft.

4. A combination of devices for maneuvering on the ground an aircraft having a landing skid, said combination comprising a pair of supporting wheels adapted to be secured to said landing skid;

a plurality of friction wheels each of which is adapted to be contacted by one of said supporting wheels;

means associated with said pair of supporting wheels for moving said wheels relative to said landing skid into ground contact and into contact with its associated friction wheel; and means comprising said friction wheels for applying rotative force to said supporting wheels for driving said supporting wheels for maneuvering said aircraft.

5. An apparatus for aiding in the maneuvering of an aircraft on the ground entirely by means of a friction drive and without necessary recourse to any ground installation, said apparatus being carried and transported by said aircraft, and said apparatus comprising, in combination:

(1) a pair of axially spaced, aircraft-supporting wheels secured to said aircraft and which are carried by and upon which said aircraft rolls during said maneuvering;

(2) a driving and steering device for attachment to said aircraft; said device comprising a pair of spaced friction wheels, each of the latter being in frictional engagement with a respective supporting wheel at a point on the top half of the circumference of said supporting wheel; said device further comprising a pair of motors, each of the latter being connected to a respective friction wheel for driving said wheel; and said driving and steering device being carried by said aircraft out of contact with the ground during said maneuvering;

(3) a source of electric power in said aircraft; and (4) manually operable switching means on said aircraft in electrical connection with said motor and said source of electric power, said means directing forward and reverse motion of each motor independently of the other;

whereby, by controlling said switching means, an operator can direct said power differentially to said motors, to said friction wheels, and to said supporting wheels and maneuver said aircraft.

6. The apparatus according to claim 5 wherein said supporting wheels are landing wheels for said aircraft.

7. The apparatus according to claim 5 wherein said combination includes landing means other than said supporting wheels and includes hydraulic means for moving said supporting wheels into and out of ground contact alternatively as said landing means is moved, respectively, out of and into ground contact.

8. The apparatus according to claim 5 wherein said source of electric power is a battery.

9. The apparatus according to claim 5 wherein said switching means is located near the rear of said aircraft.

References Cited by the Examiner

UNITED STATES PATENTS 2,539,010 1/1951 Cox _______________ 244—50
2,751,990 6/1956 Finlay et al. _________ 244—50
2,798,565 7/1957 Rosenthal et al. ______ 180—6.5

MILTON BUCHLER, *Primary Examiner.*

FERGUS S. MIDDLETON, *Examiner.*

L. C. HALL, *Assistant Examiner.*

UNITED STATES PATENT OFFICE

CERTIFICATE OF CORRECTION

Patent No. 3,279,722　　　　　　　　　　　　　　October 18, 1966

Russell K. Glover, Jr., et al.

It is hereby certified that error appears in the above numbered patent requiring correction and that the said Letters Patent should read as corrected below.

Column 4, line 66, for "of" read -- on --; column 7, line 16, strike out "roll which said aircraft is also arranged to slide;" read -- roll and a landing skid on which said aircraft is arranged to slide; a tail skid adjacent to the rear of said aircraft on which said aircraft is also arranged to slide; --; line 18, for "tail" read -- landing --.

Signed and sealed this 12th day of September 1967.

(SEAL)
Attest:

ERNEST W. SWIDER　　　　　　　　　　　　　　EDWARD J. BRENNER
Attesting Officer　　　　　　　　　　　　　　Commissioner of Patents